United States Patent
Yip et al.

(10) Patent No.: US 8,316,366 B2
(45) Date of Patent: Nov. 20, 2012

(54) FACILITATING TRANSACTIONAL EXECUTION IN A PROCESSOR THAT SUPPORTS SIMULTANEOUS SPECULATIVE THREADING

(75) Inventors: Sherman H. Yip, San Francisco, CA (US); Paul Caprioli, Santa Clara, CA (US); Marc Tremblay, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1267 days.

(21) Appl. No.: 12/061,554

(22) Filed: Apr. 2, 2008

(65) Prior Publication Data
US 2009/0254905 A1    Oct. 8, 2009

(51) Int. Cl.
*G06F 9/46* (2006.01)
(52) U.S. Cl. ..................................... 718/101
(58) Field of Classification Search ............... 718/101
See application file for complete search history.

(56) References Cited

U.S. PATENT DOCUMENTS

| | | | |
|---|---|---|---|
| 7,730,286 B2 * | 6/2010 | Petersen et al. | 712/220 |
| 8,185,700 B2 * | 5/2012 | Gimeno et al. | 711/141 |
| 2006/0212689 A1 * | 9/2006 | Chaudhry et al. | 712/228 |
| 2009/0172303 A1 * | 7/2009 | Welc et al. | 711/154 |
| 2009/0198694 A1 * | 8/2009 | Thomas | 707/8 |

* cited by examiner

*Primary Examiner* — Meng An
*Assistant Examiner* — Brian Chew
(74) *Attorney, Agent, or Firm* — Park, Vaughan, Fleming & Dowler LLP; Anthony P. Jones (57) ABSTRACT

Embodiments of the present invention provide a system that executes a transaction on a simultaneous speculative threading (SST) processor. In these embodiments, the processor includes a primary strand and a subordinate strand. Upon encountering a transaction with the primary strand while executing instructions non-transactionally, the processor checkpoints the primary strand and executes the transaction with the primary strand while continuing to non-transactionally execute deferred instructions with the subordinate strand. When the subordinate strand non-transactionally accesses a cache line during the transaction, the processor updates a record for the cache line to indicate the first strand ID. When the primary strand transactionally accesses a cache line during the transaction, the processor updates a record for the cache line to indicate a second strand ID.

22 Claims, 3 Drawing Sheets

FACILITATING TRANSACTIONAL EXECUTION IN A PROCESSOR THAT SUPPORTS SIMULTANEOUS SPECULATIVE THREADING

BACKGROUND

1. Field of the Invention

Embodiments of the present invention facilitate transactional execution in a computer system. More specifically, embodiments of the present invention facilitate transactional execution in a computer system that supports simultaneous speculative threading (SST).

2. Related Art

In order to execute code more efficiently, processors have been designed to support simultaneous speculative threading (SST), in which two or more hardware strands can be used to execute a single software thread. For example, in an SST processor that supports two hardware strands, the processor can use one strand (a "primary strand") to execute instructions for the software thread as quickly as possible while the second strand (a "subordinate strand") is idle or is performing other computational work. In order to avoid unnecessary delays, upon encountering a long-latency instruction with an unresolved data dependency (e.g., a load instruction that misses in the L1 cache and must be sent to the L2 cache), the primary strand can defer the instruction by placing the instruction into a deferred queue and can continue executing subsequent instructions. While executing the subsequent instructions, the primary strand can similarly defer instructions that have unresolved dependencies. When data ultimately returns for a deferred instruction, the subordinate strand can make one or more passes through the deferred queue to execute deferred instructions that depend on the returned data, while the primary strand can continue to execute non-deferred instructions.

Some SST systems also support transactional execution (also called "transactional memory") in which designated sections of code are executed in a transaction. Generally, executing a section of code in a transaction involves ensuring that other threads do not interfere with memory accesses made during the transaction and that the transaction appears to be atomic from the perspective of other threads. Transactional execution is known in the art and hence is not described in more detail.

In some SST systems that support transactional execution, cache line accesses from a thread (i.e., from the strands that are being used to execute the thread) are tracked in the L2 cache using a single strand identifier. Consequently, using the primary strand to execute a transaction while using the subordinate strand to execute deferred instructions can cause errors. These systems therefore execute the transaction using only the primary strand, while the subordinate strand is idle or is executing code that is unrelated to the transaction.

In order to execute a transaction in this way, the strands must reach a consistent state prior to the beginning of the transaction. In some systems, this involves executing an "instruction barrier," which causes the primary strand to stall until the subordinate strand executes all pre-transactional deferred instructions and all other pre-transactional operations for the thread have been completed (e.g., buffered loads and stores have been committed to the system's architectural state). When the strands reach a consistent state, the system begins executing the transaction using the primary strand. Unfortunately, stalling the primary strand until the subordinate strand reaches a consistent state results in an inefficient use of computational resources.

Hence, what is needed is a processor that supports transactional execution and SST without the above-described problem.

SUMMARY

Embodiments of the present invention provide a system that executes a transaction on a simultaneous speculative threading (SST) processor. The processor starts by using a primary strand to non-transactionally execute instructions for a software thread and to defer instructions which cannot be executed due to unresolved data dependencies while using a subordinate strand to non-transactionally execute the deferred instructions as data becomes available for the deferred instructions. When the primary strand or the subordinate strand access a cache line during non-transactional execution, the processor updates a record for the accessed cache line to indicate a first strand ID.

Upon encountering a transaction with the primary strand, the processor checkpoints the primary strand and executes the transaction with the primary strand while continuing to non-transactionally execute deferred instructions with the subordinate strand. When the subordinate strand non-transactionally accesses a cache line during the transaction, the processor updates a record for the cache line to indicate the first strand ID. When the primary strand transactionally accesses a cache line during the transaction, the processor updates a record for the cache line to indicate a second strand ID.

In some embodiments, upon completing the transaction, the processor returns to using the primary strand to non-transactionally execute instructions for the software thread and deferring instructions which cannot be executed due to unresolved data dependencies while using the subordinate strand to non-transactionally execute deferred instructions as data returns for the deferred instructions. When the primary strand or the subordinate strand access a cache line during non-transactional execution, the processor updates the record for the accessed cache line to indicate the first strand ID.

In some embodiments, upon encountering interfering access during a transaction or a condition which prevents the transaction from completing, the processor fails the transaction.

In some embodiments, when failing the transaction, the processor: (1) discards the results from the transaction by invalidating each cache line whose record indicates the second strand ID; (2) restores a checkpoint for the primary strand; and (3) commences execution for the primary strand from the checkpoint.

In some embodiments, when updating the record for an accessed cache line, the processor updates metadata in the accessed cache line.

In some embodiments, when updating the record for an accessed cache line, the processor updates a record for the cache line in a directory or in a data structure stored in a memory.

Embodiments of the present invention provide a system for executing nested transactions on an SST processor. The processor starts by using two or more strands to non-transactionally execute instructions for a software thread. While non-transactionally executing the instructions, the processor updates a record for each accessed cache line to indicate a non-transactional strand ID when any of the strands accesses the cache line. Upon encountering a first transaction, the processor: (1) synchronizes the strands; (2) checkpoints a first strand; and (3) executes the first transaction with the first strand. During the first transaction, the processor updates a record for each cache line accessed by the first strand to indicate a strand ID for the first strand. Upon encountering a subsequent transaction during the first transaction, the processor: (1) checkpoints a next strand; and (2) executes the subsequent transaction with the next strand, which involves updating a record for each cache line accessed by the next strand during the subsequent transaction to indicate a strand ID for the next strand.

In some embodiments, when synchronizing the strands, the processor completes pre-transactional operations for the strands and then places some or all of the strands in a wait mode or uses some or all of the strands to perform computational work that is unrelated to the first transaction.

In some embodiments, encountering the first transaction involves encountering an outer_transaction instruction.

In some embodiments, encountering subsequent transactions during the transaction involves encountering an inner_transaction instruction.

In some embodiments, upon encountering interfering access during a transaction or a condition which prevents the transaction from completing, the processor fails the transaction.

In some embodiments, failing a transaction for a strand involves: (1) discarding the results from the transaction by invalidating each cache line whose record indicates the strand ID for the strand; (2) restoring the checkpoint for the strand; and (3) commencing execution for the strand from the checkpoint.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Terminology

The following description includes the terms "strand" and "thread." Although these terms are known in the art, the following definitions are provided to clarify the subsequent description.

A thread is a software entity that can be run on hardware. For example, a software process can be executed using one or more software threads.

A strand includes state information that is stored in hardware that is used to execute a thread. More specifically, a strand includes the software-visible architectural state of a thread, along with any other microarchitectural state required for the thread's execution. For example, a strand can include a program counter (PC), a next program counter (NPC), and one or more general-purpose registers, floating-point registers, condition-code registers, status registers, or ancillary state registers (ASRs).

Simultaneous Speculative Threading

Embodiments of the present invention support simultaneous speculative threading (SST) wherein two or more strands are used to execute a single software thread. For example, some embodiments of the present invention use a "primary strand" and a "subordinate strand" to execute the thread. These embodiments can use the primary strand to execute instructions for the thread as quickly as possible, while the second strand is idle or is performing other computational work. In order to avoid unnecessary delays, upon encountering a long-latency instruction with an unresolved data dependency (e.g., a load instruction that misses in L1 cache 104 (see FIG. 1) and must be sent to the L2 cache 106), these embodiments defer the instruction by placing the instruction into a deferred queue and use the primary strand to continue executing subsequent instructions. While executing the subsequent instructions using the primary strand, these embodiments continue to defer instructions that have unresolved dependencies (e.g., a dependency on an already-deferred instruction). When data returns for a deferred instruction, these embodiments use the subordinate strand to make one or more passes through the deferred queue to execute deferred instructions that depended on the data (while using the primary strand to continue to execute instructions).

Although we describe embodiments of the present invention that use two strands to execute a single thread in SST mode, alternative embodiments can use more than two strands. For example, some embodiments can use two or more strands to provide a primary strand and a subordinate strand. Alternatively, one or more strands can be idle or can be performing computational work that is unrelated to the thread. When the thread can use an additional strand to improve performance (e.g., for executing deferred instructions or for a nested checklist (as described below)), these embodiments can use the strand to perform the computational work.

Note that the designations "primary strand" and "subordinate strand" used in this description do not indicate a particular strand. In general, any strand can function as a primary strand or a subordinate strand. In some embodiments, a strand can be switched between being a primary strand and a subordinate strand during operation.

Transactional Execution

Embodiments of the present invention support transactional execution during SST. During transactional execution, these embodiments execute a critical section of code as a transaction. While executing the transaction, these embodiments protect transactional memory accesses from interfering accesses by other threads and enforce the appearance of atomicity of the critical section with respect to other threads. Note that a "critical section" can be any section of the code that is to be protected from interference by other threads. A critical section can include a single instruction or a number of instructions.

Generally, before a transaction starts, these embodiments checkpoint the precise architectural state of the processor to enable the recovery of the pre-transactional state in case the transaction fails. Then, during the transaction, these embodiments buffer transactional results to enable the results to be discarded in case the transaction fails. During the transaction, these embodiments monitor transactionally accessed cache lines to determine if another thread has interfered with the transaction. If the transaction completes without interference from another thread, these embodiments atomically commit the buffered transactional results and continue executing the code following the critical section. Otherwise, the transaction fails and these embodiments delete the buffered transactional results, use the checkpoint to restore the pre-transactional state, and resume execution just before the critical section. Transactional execution is known in the art and hence is not described in more detail.

Handling Transactional Execution During SST

Embodiments of the present invention handle transactions during SST differently than existing systems. More specifically, embodiments of the present invention track cache line accesses for the strands in the L2 cache using separate strand identifiers during transactions. In contrast, existing systems track all cache line accesses for a thread (i.e., from either strand) in the L2 cache using only one strand identifier during both non-transactional and transactional execution.

By tracking cache line accesses to the L2 cache during transactions using separate strand identifiers, embodiments of the present invention can identify which cache lines are accessed transactionally by the primary strand and which cache lines are accessed non-transactionally by the subordinate strand. This, in turn, facilitates executing transactional instructions using the primary strand while simultaneously executing pre-transactional deferred instructions using the subordinate strand. Thus, unlike in existing systems, where the subordinate strand is idle during the transaction (or is performing computational work that is unrelated to the transaction), embodiments of the present invention can continue using the subordinate strand to execute pre-transactional deferred instructions during the transaction. Hence, these embodiments do not force the strands to reach a consistent state before beginning the transaction with the primary strand.

Computer System

Figure 1:
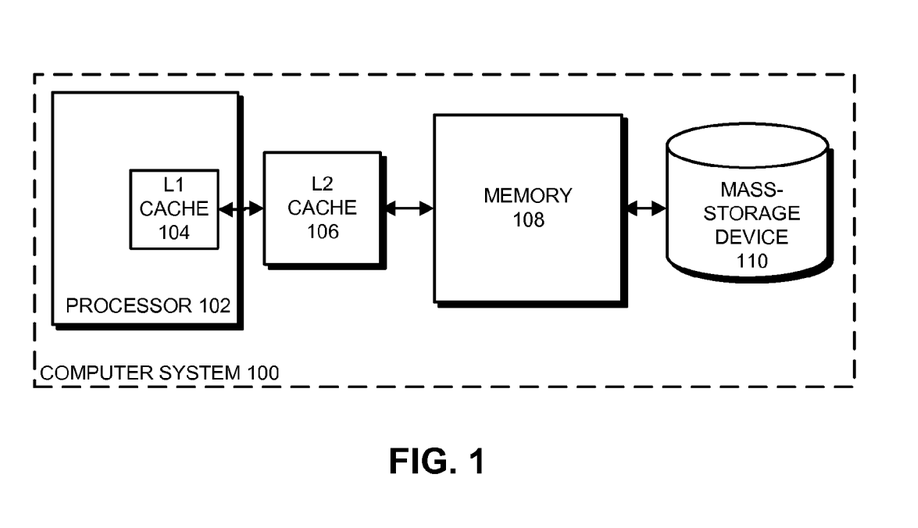
FIG. 1 presents a block diagram of a computer system in accordance with embodiments of the present invention.

FIG. 1 presents a block diagram of a computer system 100 in accordance with embodiments of the present invention. Computer system 100 includes processor 102, L2 cache 106, memory 108, and mass-storage device 110.

Processor 102 can be a general-purpose processor that performs computational operations. For example, processor 102 can be a central processing unit (CPU) such as a microprocessor. Note that processor 102 can also be a controller or an application-specific integrated circuit. Processor 102 includes L1 cache 104.

In embodiments of the present invention, processor 102 supports two or more strands. (Recall that a strand includes state information which is used to execute the thread.) For example, a strand can include a PC, an NPC, general-purpose registers, floating-point registers, condition-code registers, status registers, and ASRs, among other state information. In embodiments of the present invention, processor 102 supports SST, wherein two or more strands can be used together to execute a software thread.

Mass-storage device 110, memory 108, L2 cache 106, and L1 cache 104 collectively form a memory hierarchy that stores data and instructions for processor 102. Generally, mass-storage device 110 is a high-capacity non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments of the present invention, L2 cache 106, memory 108, and mass-storage device 110 are shared between one or more processors in computer system 100. Such memory structures are well-known in the art and are therefore not described in more detail.

In embodiments of the present invention, computer system 100 includes hardware mechanisms for supporting transactional execution. For example, computer system 100 can include: an indication mechanism that keeps track of when a strand (or thread) is executing a transaction; a checkpointing mechanism for checkpointing an architectural state of a strand for recovering the strand to the pre-transactional state if the associated transaction fails; a recording mechanism for recording which cache lines have been accessed during a transaction; a monitoring mechanism for monitoring cache line accesses from other threads; and a recovery mechanism for recovering from transactional failures. Some or all of these mechanisms can be included in processor 102, L1 cache 104, L2 cache 106, memory 108, or mass-storage device 110. Alternatively, some or all of these mechanisms can be included in separate circuits within computer system 100.

Although we use specific components to describe computer system 100, in alternative embodiments different components can be present in computer system 100. For example, computer system 100 can include video cards, network cards, optical drives, and/or other peripheral devices that are coupled to processor 102 using a bus, a network, or another suitable communication channel. Alternatively, computer system 100 may include one or more additional processors, wherein the processors share some or all of L2 cache 106, memory 108, and mass-storage device 110.

Computer system 100 can be used in many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (i.e., a "smart phone"), a guidance system, a control system (e.g., an automotive control system), or another electronic device.

Cache Line Access-Tracking Mechanisms

Embodiments of the present invention include one or more access-tracking mechanisms for identifying which strands have accessed cache lines in L2 cache 106. Generally, the access-tracking mechanisms keep track of a strand identifier (a "strand ID") for the last strand that accessed (e.g., loaded from or stored to) a given cache line in L2 cache 106.

Some embodiments of the present invention include an access-tracking mechanism in processor 102 that keeps a record of the accesses to cache lines in the L2 cache 106 made by each strand. For example, processor 102 can include a per-strand directory that processor 102 uses to keep track of the cache lines accessed by the associated strand.

Figure 2:
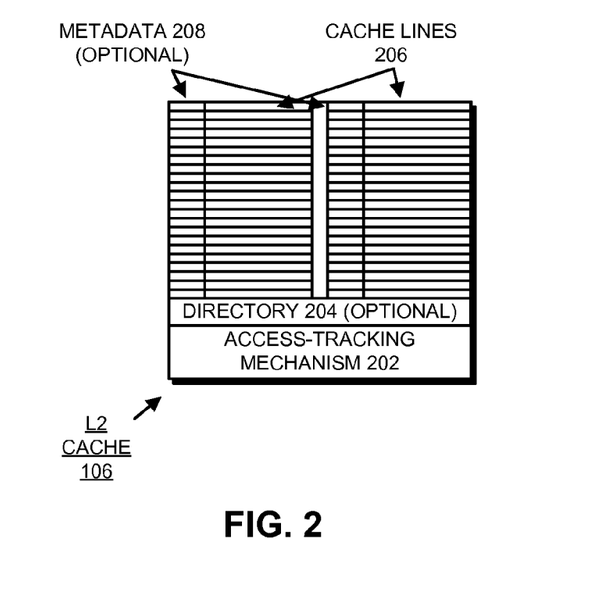
FIG. 2 presents a block diagram illustrating an access-tracking mechanism in a cache in accordance with embodiments of the present invention.

Some embodiments of the present invention include an access-tracking mechanism in L2 cache 106 for keeping track of which strands have accessed cache lines in L2 cache 106. For example, FIG. 2 presents a block diagram illustrating an access-tracking mechanism 202 in L2 cache 106 in accordance with embodiments of the present invention. In some of these embodiments, access-tracking mechanism 202 tracks cache line accesses by using metadata 208 in cache lines 206. More specifically, in these embodiments, each cache line 206 in L2 cache 106 includes metadata 208 which identifies the last strand that accessed the cache line. In alternative embodiments, access-tracking mechanism 202 uses a directory 204 for storing a list of accessed cache lines that includes a strand ID of the last strand that accessed the cache line in L2 cache 106.

Figure 3:
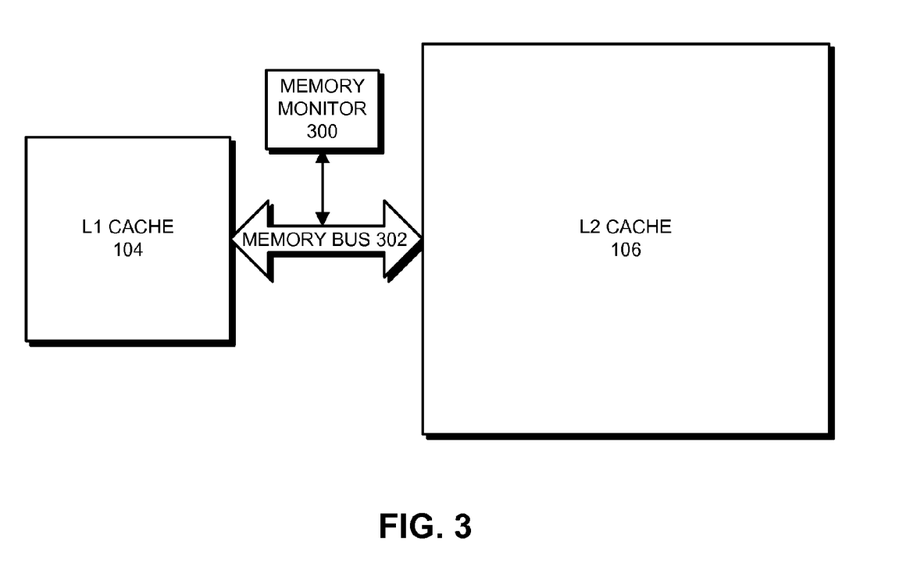
FIG. 3 presents a block diagram illustrating a memory monitor that monitors a memory bus to track cache line accesses in accordance with embodiments of the present invention.

Some embodiments of the present invention include one or more separate access-tracking mechanisms for monitoring cache line accesses. For example, FIG. 3 presents a block diagram illustrating a memory monitor 300 that monitors a memory bus 302 to track cache line accesses. During operation, memory monitor 300 snoops memory bus 302 to track cache line accesses to L1 cache 104 and/or L2 cache 106. In some embodiments, memory monitor 300 is located in processor 102 or in a separate memory controller in computer system 100.

Non-Transactional Cache Line Accesses During SST

While executing code for a software thread non-transactionally during SST, embodiments of the present invention can associate all cache line accesses from the thread (i.e., from both the primary and subordinate strands) to L2 cache 106 with a single strand. In other words, even though the access-tracking mechanism can identify cache line accesses from either strand, these embodiments can associate cache line accesses from both strands with a single strand ID. Because cache line accesses for the thread, whether from the primary strand or from the subordinate strand, are associated with the same strand ID, these embodiments can track non-transactional cache line accesses at the thread-level.

Figure 4:
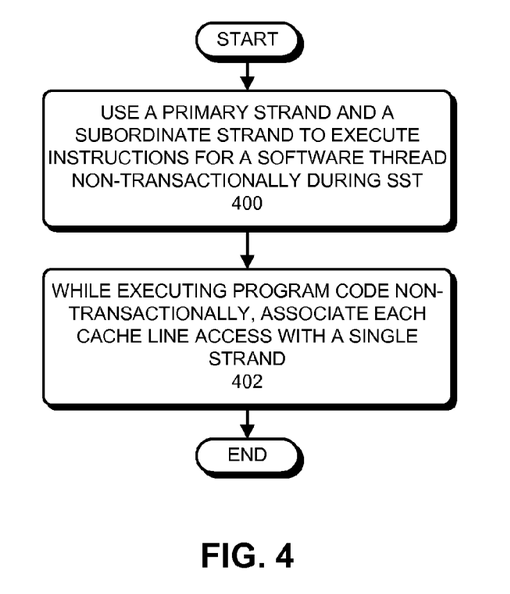
FIG. 4 presents a flowchart illustrating the process of executing code non-transactionally during SST in accordance with embodiments of the present invention.

FIG. 4 presents a flowchart illustrating the process of executing code non-transactionally during SST in accordance with embodiments of the present invention. The process starts with processor 102 using a primary strand and a subordinate strand to execute instructions for a software thread non-transactionally during SST (step 400).

While executing the code non-transactionally, processor 102 configures L2 cache 106 to associate each cache line access with only a single strand (step 402). For example, assuming that the system supports strand IDs "0" and "1," and further assuming that L2 cache 106 tracks cache line accesses by updating metadata in accessed cache lines, processor 102 can configure L2 cache 106 to update the metadata for all non-transactionally accessed cache lines with the strand identifier 0. Alternatively, assuming that L2 cache 106 tracks cache line accesses by updating an entry in a directory, processor 102 can configure L2 cache 106 to update a directory entry for a cache line to specify the strand ID 0. Moreover, assuming that computer system 100 uses memory monitor 300 to track cache line accesses, memory monitor 300 can detect the cache line access on memory bus 302 and can update a record for the cache line to specify an access by strand ID 0. On the other hand, assuming that processor 102 tracks per-strand cache line accesses, processor 102 can update a record of cache line accesses for the strand (e.g., strand 0) to include each cache line access.

Transactional Cache Line Accesses During SST

While executing code transactionally during SST, embodiments of the present invention can associate cache line accesses by the primary strand and the subordinate strand to L2 cache 106 with different strand IDs. More specifically, during a transaction, cache line accesses for a primary strand can be associated with one strand ID, while cache line accesses for the subordinate strand can be associated with a different strand ID.

Figure 5:
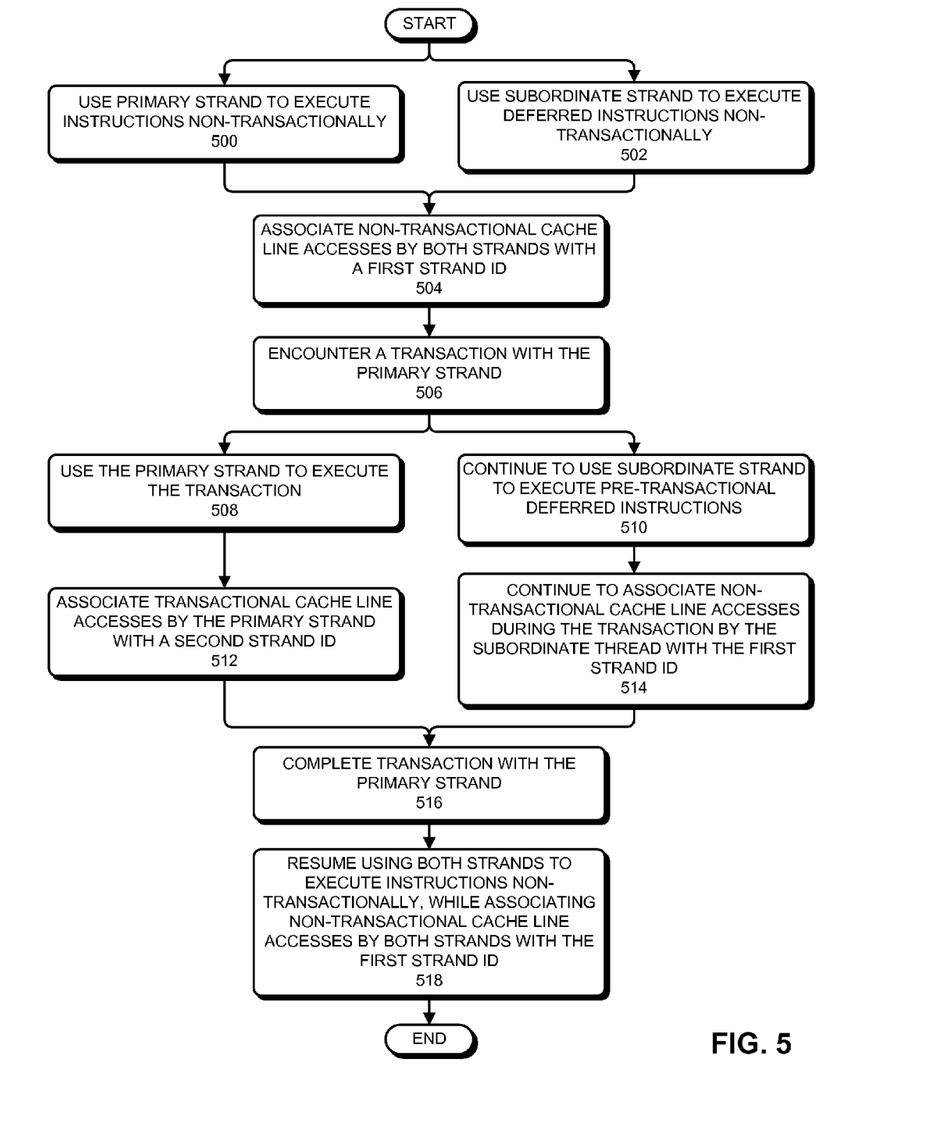
FIG. 5 presents a flowchart illustrating the process of executing code transactionally during SST in accordance with embodiments of the present invention.

FIG. 5 presents a flowchart illustrating the process of executing code transactionally during SST in accordance with embodiments of the present invention. The process starts when processor 102 executes code for a software thread non-transactionally during SST. More specifically, the process starts when processor 102 uses a primary strand to execute instructions non-transactionally (step 500) and uses a subordinate strand to execute deferred instructions non-transactionally (step 502).

While executing code non-transactionally, processor 102 configures L2 cache 106 to associate each non-transactional cache line access with one strand ID (step 504). For example, assuming that the system supports strand IDs "0" and "1," and further assuming that L2 cache 106 tracks cache line accesses by updating metadata in accessed cache lines, processor 102 can configure L2 cache 106 to update the metadata for all non-transactionally accessed cache lines with the strand ID 0. Alternatively, assuming that L2 cache 106 tracks cache line accesses by updating an entry in a directory, processor 102 can configure L2 cache 106 to update a directory entry for a cache line to specify strand ID 0. On the other hand, assuming that computer system 100 uses memory monitor 300 to track cache line accesses, memory monitor 300 could detect the cache line access on memory bus 302 and update a record for the cache line to specify an access by strand ID 0. Moreover, assuming that processor 102 tracks per-strand cache line accesses, processor 102 can update a record of cache line accesses for the strand (e.g., strand 0) to include each cache line access.

For simplicity, in the remaining description we describe only the embodiments of the present invention wherein processor 102 configures L2 cache 106 to update metadata in accessed cache lines. However, embodiments that use other cache line access-tracking mechanisms can correspondingly function as described above.

Upon encountering a transaction for the thread to be executed by the primary strand (step 506), processor 102 checkpoints the primary strand and uses the primary strand to execute the transaction (step 508). Processor 102 also continues to use the subordinate strand to execute pre-transactional deferred instructions (step 510). Checkpointing the primary strand involves saving the precise architectural state of the primary strand to enable recovery to the pre-transactional state in case the transaction fails. For example, processor 102 can save the primary strand's PC, NPC, general-purpose registers, floating-point registers, condition-code registers, status registers, ASRs, and/or other architectural state for recovering the pre-transactional state.

Next, processor 102 uses the subordinate strand to execute the pre-transactional deferred instructions as data becomes available for these instructions. In some embodiments of the present invention, if there are no pre-transactional deferred instructions to be executed (or if data has not yet returned), processor 102 holds the subordinate thread in an idle state or uses the subordinate strand to perform other computational work (i.e., computational work that is unrelated to the transaction).

During the transaction, processor 102 configures L2 cache 106 to associate all transactional cache line accesses by the primary strand with a second strand ID (step 512). For example, assuming the above-described system that records cache line accesses in metadata for the cache line, processor 102 can configure L2 cache 106 to update the metadata for all transactionally accessed cache lines with the strand ID 1 (instead of the original strand ID 0). Note that associating these cache line accesses with a different strand ID facilitates recovery to a pre-transactional state in case the transaction fails.

Processor 102 also configures L2 cache 106 to associate all cache line accesses during the transaction by the subordinate strand with the first strand ID (step 514). For example, assuming the above-described system, processor 102 can configure L2 cache 106 to continue to update the metadata for all non-transactionally accessed cache lines with the strand ID 0.

Because processor 102 continues to use the same strand ID for deferred instructions that are executed by the subordinate strand, all pre-transactional cache line accesses can be tracked using the strand ID.

Although the subordinate strand can continue to execute pre-transactional deferred instructions, the primary strand does not defer instructions during the transaction. (If an instruction cannot be executed by the primary strand during the transaction, processor 102 fails the transaction.)

Upon completing the transaction using the primary strand (step 516), processor 102 resumes using both strands to execute instructions non-transactionally, while again associating non-transactional cache line accesses by both strands with the first strand ID (step 518).

Transactional Failure

In some embodiments of the present invention, processor 102 fails a transaction when a transactional operation cannot be completed or when another thread interferes with the transaction. In these embodiments, failing the transaction involves discarding the transactional results by invalidating (or clearing) each cache line that is recorded as having been accessed by the second strand ID. When failing the transaction, these embodiments can also restore the checkpointed state for the primary strand and can commence execution for the primary strand from just before the transaction.

Nested Transactions During SST

Some embodiments of the present invention support nested transactions (i.e., executing one or more "inner" transactions during one or more "outer" transactions). These embodiments can use a different strand to execute each transaction and can track the transactional cache line accesses made by each strand using different strand IDs. Because these embodiments use different strand IDs for tracking the cache line accesses made by each strand and hence each transaction, the transactions can be separately recovered from in case they fail.

In some embodiments of the present invention, during non-transactional execution a predetermined strand ID, which is different than any strand ID that is used during a transaction, can be used to track instructions. In this way, non-transactional instructions can always be identified using the unique strand ID. Upon encountering an outer transaction, these embodiments checkpoint a first strand and then use the first strand to execute the outer transaction. While the first strand is used to execute the outer transaction, the second strand is idle (or is used to perform computational work unrelated to the transaction), while the second strand awaits commencement of a nested transaction. These embodiments use one strand ID (e.g., strand ID 0) to track each cache line access by the first strand during the outer transaction.

When the inner transaction is subsequently encountered by the first strand, these embodiments checkpoint the second strand and then use the second strand to execute the inner transaction. These embodiments track each cache line access by the second strand using a different strand ID (e.g., strand ID 1).

Some embodiments of the present invention support a synchronization operation for nested transactions. In these embodiments, when a first strand encounters a nested transaction, the first strand is stalled while the other strands catch up.

In some embodiments of the present invention, an outer transaction can be initiated by an "outer transaction" instruction, while an inner transaction is initiated by an "inner transaction" instruction. This allows programmers to indicate to processor 102 the way in which nested transactions interrelate.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a transaction on a simultaneous speculative threading (SST) processor, comprising:
   using a primary strand to non-transactionally execute instructions for a software thread and to defer instructions which cannot be executed due to unresolved data dependencies;
   using a subordinate strand to non-transactionally execute deferred instructions in the deferred instructions as data becomes available for the deferred instructions;
   when the primary strand or the subordinate strand access a cache line during non-transactional execution, updating a record for the accessed cache line to indicate a first strand ID;
   upon encountering a transaction with the primary strand, checkpointing the primary strand and executing the transaction with the primary strand while continuing to non-transactionally execute deferred instructions with the subordinate strand;
   when the subordinate strand non-transactionally accesses a cache line during the transaction, updating a record for the cache line to indicate the first strand ID; and
   when the primary strand transactionally accesses a cache line during the transaction, updating a record for the cache line to indicate a second strand ID,
   wherein during the transaction the first strand ID identifies the subordinate strand and the second strand ID identifies the primary strand.

2. The method of claim 1, wherein the method further comprises:
   upon completing the transaction, returning to using the primary strand to non-transactionally execute instructions for the software thread and to defer one or more instructions which cannot be executed due to unresolved data dependencies;
   using the subordinate strand to non-transactionally execute instructions in the deferred instructions or instructions in the one or more instructions as data returns for the deferred instructions or the one or more instructions; and
   when the primary strand or the subordinate strand access a cache line during non-transactional execution, updating the record for the accessed cache line to indicate the first strand ID.

3. The method of claim 1, wherein upon encountering an interfering access during the transaction or a condition which prevents the transaction from completing, the method further comprises failing the transaction.

4. The method of claim 3, wherein failing the transaction involves:
   discarding results from the transaction by invalidating each cache line whose record indicates the second strand ID;
   restoring a checkpoint for the primary strand; and
   commencing execution for the primary strand from the checkpoint.

5. The method of claim 1, wherein updating the record for an accessed cache line involves updating metadata in the accessed cache line.

6. The method of claim 1, wherein updating the record for an accessed cache line involves updating a record for the cache line in a directory or in a data structure stored in a memory.

7. A method for executing nested transactions on an SST processor, comprising:
 using two or more strands to non-transactionally execute instructions for a software thread, wherein non-transactionally executing the instructions involves updating a record for each accessed cache line to indicate a non-transactional strand ID when any of the strands accesses the cache line;
 upon encountering a first transaction,
  synchronizing the strands, wherein synchronizing the strands involves completing pre-transactional operations for the strands and then placing some or all of the strands in a wait mode or using some or all of the strands to perform computational work that is unrelated to the first transaction,
  checkpointing a first strand, and
  executing the first transaction with the first strand, which involves updating a record for each cache line accessed by the first strand during the first transaction to indicate a strand ID for the first strand; and upon encountering a subsequent transaction during the first transaction,
  checkpointing a next strand, and
  executing the subsequent transaction with the next strand, which involves updating a record for each cache line accessed by the next strand during the subsequent transaction to indicate a strand ID for the next strand,
 wherein the strand ID for the first strand identifies the first strand and the strand ID for the next strand identifies the next strand.

8. The method of claim 7, wherein encountering the first transaction involves encountering an outer $_{13}$ transaction instruction.

9. The method of claim 8, wherein encountering the subsequent transaction involves encountering an inner transaction instruction.

10. The method of claim 7, wherein upon encountering interfering access during a transaction or a condition which prevents the transaction from completing, the method further comprises failing the transaction.

11. The method of claim 10, wherein failing a transaction for a strand involves:
 discarding results from the transaction by invalidating each cache line whose record indicates the strand ID for the strand;
 restoring the checkpoint for the strand; and
 commencing execution for the strand from the checkpoint.

12. An apparatus for executing a transaction on a simultaneous speculative threading (SST) processor, comprising:
 a primary strand and a subordinate strand on the processor;
 a cache coupled to the processor;
 wherein the processor uses the primary strand to non-transactionally execute instructions for a software thread and to defer instructions which cannot be executed due to unresolved data dependencies;
 wherein the processor uses the subordinate strand to non-transactionally execute deferred instructions in the deferred instructions as data becomes available for the deferred instructions;
 wherein upon accessing a cache line using the primary strand or the subordinate strand during non-transactional execution, the processor updates a record for the accessed cache line to indicate a first strand ID;
 wherein upon encountering a transaction with the primary strand, the processor checkpoints the primary strand and executes the transaction with the primary strand while continuing to non-transactionally execute deferred instructions with the subordinate strand;
 wherein upon non-transactionally accessing a cache line using the subordinate strand during the transaction, the processor updates a record for the accessed cache line to indicate the first strand ID;
 wherein upon transactionally accessing a cache line using the primary strand during the transaction, the processor updates a record for the accessed cache line to indicate a second strand ID; and
 wherein during the transaction the first strand ID identifies the subordinate strand and the second strand ID identifies the primary strand.

13. The apparatus of claim 12, wherein upon completing the transaction, the processor:
 resumes using the primary strand to non-transactionally execute instructions for the software thread and to defer one or more instructions which cannot be executed due to unresolved data dependencies;
 uses the subordinate strand to non-transactionally execute instructions in the deferred instructions or instructions in the one or more instructions as data returns for the deferred instructions or the one or more instructions; and
 updates the record for each accessed cache line to indicate the first strand ID upon accessing the cache line using the primary strand or the subordinate strand during non-transactional execution.

14. The apparatus of claim 12, wherein upon encountering an interfering access during the transaction or a condition which prevents the transaction from completing, the processor fails the transaction.

15. The apparatus of claim 14, wherein when failing the transaction, the processor:
 discards results from the transaction by invalidating each cache line whose record indicates the second strand ID;
 restores a checkpoint for the primary strand; and
 commences execution for the primary strand from the checkpoint.

16. The apparatus of claim 12, wherein when updating the record for an accessed cache line, the processor updates metadata in the accessed cache line.

17. The apparatus of claim 12, wherein when updating the record for an accessed cache line, the processor updates a record for the cache line in a directory or in a data structure stored in a memory.

18. An apparatus for executing nested transactions on an SST processor, comprising:
 two or more strands on the processor;
 a cache coupled to the processor;
 wherein the processor uses the strands to non-transactionally execute instructions for a software thread, wherein when non-transactionally executing the instructions, the processor updates a record for each accessed cache line to indicate a non-transactional strand ID when any of the strands accesses the cache line;
 upon encountering a first transaction, the processor synchronizes the strands, checkpoints a first strand, and executes the first transaction with the first strand, wherein during the first transaction, the processor updates a record for each cache line accessed by the first strand to indicate a strand ID for the first strand; and upon encountering a subsequent transaction during the first transaction, the processor checkpoints a next strand, and executes the subsequent transaction with the next strand, wherein during the subsequent transaction, the processor updates a record for each cache line accessed by the next strand during the subsequent transaction to indicate a strand ID for the next strand, wherein the strand ID for the first strand identifies the first strand and the strand ID for the next strand identifies the next strand, and wherein when synchronizing the strands, the processor completes pre-transactional operations for the strands and then places some or all of the strands in a wait mode, or uses some or all of the strands to perform computational work that is unrelated to the first transaction.

19. The apparatus of claim 18, wherein when encountering the first transaction, the processor encounters an outer_transaction instruction.

20. The apparatus of claim 19, wherein when encountering the subsequent transaction the processor encounters an inner_transaction instruction.

21. The apparatus of claim 18, wherein upon encountering an interfering access during a transaction or a condition which prevents the transaction from completing, the processor fails the transaction.

22. The apparatus of claim 21, wherein when failing a transaction for a strand, the processor:
   discards results from the transaction by invalidating each cache line whose record indicates the strand ID for the strand;
   restores the checkpoint for the strand; and
   commences execution for the strand from the checkpoint.

* * * * *